United States Patent [19]
Lobdell

[11] 4,441,795
[45] Apr. 10, 1984

[54] MOLDED MULTIFOCAL LENS AND MOLD ASSEMBLY

[75] Inventor: Alban J. Lobdell, Plantation, Fla.

[73] Assignee: Camelot Industries Corporation, Burlington, Mass.

[21] Appl. No.: 133,186

[22] Filed: Mar. 24, 1980

[51] Int. Cl.³ ............... B29C 11/00; B29D 11/00; G02C 7/06

[52] U.S. Cl. ............... 351/169; 249/53 R; 249/103; 264/1.1; 264/2.2; 425/808

[58] Field of Search ............... 425/808; 264/2.2, 2.5, 264/1.1; 351/159, 169, 174, 177; 249/117, 53 R, 103

[56] References Cited

U.S. PATENT DOCUMENTS

| | | |
|---|---|---|
| 1,171,419 | 2/1916 | Fink . |
| 1,416,947 | 5/1922 | Dey . |
| 2,033,101 | 3/1936 | Tillyer et al. . |
| 2,140,410 | 12/1938 | Titmus . |
| 2,704,010 | 3/1955 | Lantz . |
| 3,674,587 | 7/1972 | LaLiberte ............... 425/808 X |
| 3,881,683 | 5/1975 | Whitney ............... 351/174 X |

FOREIGN PATENT DOCUMENTS 2216089 8/1974 France ............... 264/2.2

*Primary Examiner*—John K. Corbin
*Assistant Examiner*—Scott J. Sugarman
*Attorney, Agent, or Firm*—Hamilton, Brook, Smith and Reynolds

[57] ABSTRACT

A lens having a set of physical features provided on the edge thereof for permitting a set of reference marks to be placed on the lens surface together with an apparatus for applying these physical features to the lens. The apparatus comprises a mold assembly in which the gasket is provided with a plurality of precisely located ridges which define a plurality of corresponding notches formed on the edge of the lens to locate, for example, the distance portion optical center and the 0°–180° lines of a progressive power lens. The gasket is additionally provided with other ridges adapted to mate with grooves formed on the mold member defining the progressive lens surface to ensure proper alignment of that member with the gasket.

11 Claims, 4 Drawing Figures

MOLDED MULTIFOCAL LENS AND MOLD ASSEMBLY

DESCRIPTION

TECHNICAL FIELD

The present invention relates to a lens having a set of physical features provided on the edge thereof for use in mechanically orienting the lens so as to permit a set of reference marks to be placed on the lens surface. The present invention further relates to an apparatus for applying these physical features to the lens.

BACKGROUND ART

In recent years, a new type of multifocal ophthalmic lens has been introduced into the marketplace. This lens is generally known as a progressively variable focal power lens, or, more simply, as a progressive power lens, and it is designed to provide multifocal lens characteristics without any sharp dividing line or other discontinuity between the various portions of the lens. Specifically, such lenses are characterized by having a progressive corridor portion positioned between the distance and reading portions of the lens and having a continuously varying focal power beginning with a focal power equal to that of the distance portion where it merges with and into the distance portion and ending with a focal power equal to that of the reading portion where it merges into the reading portion of the lens. By gradually varying in focal power in this way, the sharp dividing lines normally found between the different portions of the multifocal lens are eliminated, and a lens is provided that is continuous throughout, both physically and optically.

Typical of the progressively variable focal power lenses found in the prior art are those described in U.S. Pat. Nos. 3,687,528; 3,711,191; and 4,056,311.

Because progressive power lenses have no readily visible multifocal features inherent in their design, such as the boundary lines found in conventional multifocal lenses, there is nothing on the lens that can be used, by a surfacing laboratory or by an optical dispenser, for example, as a reference to locate various surface features.

Partially in recognition of this problem, it has become the practice of progressive lens manufactures to place two very faint, generally circular marks on the lens surface which can be used in conjunction with an appropriate fixture to locate the optical centers of the distance and reading portions of the lens. Although this is suitable for use by the optical dispenser to measure and test a finished lens, and for other purposes, it is not very suitable for use by the surfacing laboratory which needs appropriate markings as an aid in surfacing layout and finishing layout procedures.

It is also taught in the prior art to place short lines or hash marks at appropriate locations on the lens surface to be used, in conjunction with an appropriate fixture, to locate and ink the distance portion optical center and the 0°–180° lines (which are used to indicate the extent to which the lens is to be rotated to accommodate the left or right eye). One disadvantage of this technique is that an appropriate fixture is needed which must be visually lined up with respect to the hash marks to permit the lens to be marked and care must be taken to ensure that the marks are placed accurately. Also, in the case of plastic lenses (most progressive power lenses are manufactured of plastic) wherein the marks are replicated on the lens surface from a mold surface against which the lens is cast, substantial care is also necessary to ensure that the mold surface is accurately positioned in the mold assembly so that the marks will be accurately positioned on the lens surface. Also, because the hash marks are on the lens surface, they decrease the effective useable diameter of the lens.

DISCLOSURE OF THE INVENTION

By the present invention, a lens is provided which has a set of physical features positioned on its edge which can be used to mechanically orient the lens for the purpose of inking a set of reference marks on its surface or for otherwise identifying desired features of the lens. In accordance with a presently preferred embodiment, these physical features are in the form of a plurality of notches which are adapted to mate with an appropriate finger element which permits lens features such as the distance portion optical center and the left and right eye 0°–180° lines to be automatically and accurately located for inking or for other purposes.

The notches are made by ridges formed in the inner wall of the gasket which defines the edge of the mold cavity within which the lens is cast, and, as a further important feature of the invention, these ridges are, in turn, precisely located with respect to other ridges on the gasket which are adapted to mate with notches on the mold member that forms the progressive power surface of the lens. This permits the mold member to be precisely positioned relative to the gasket in a quick and easy manner to ensure that the notches formed in the lens will also be accurately positioned.

In summary, with the present invention, it becomes a simple matter to provide precisely located notches on the edge of a lens for use by the optical manufacturer, optical surfacing laboratory or others to rapidly and accurately mark or identify various lens features.

Further details of the invention will be set out hereinafter in conjunction with the description of the best mode for carrying out the invention.

BEST MODE FOR CARRYING OUT THE INVENTION

Figure 1:
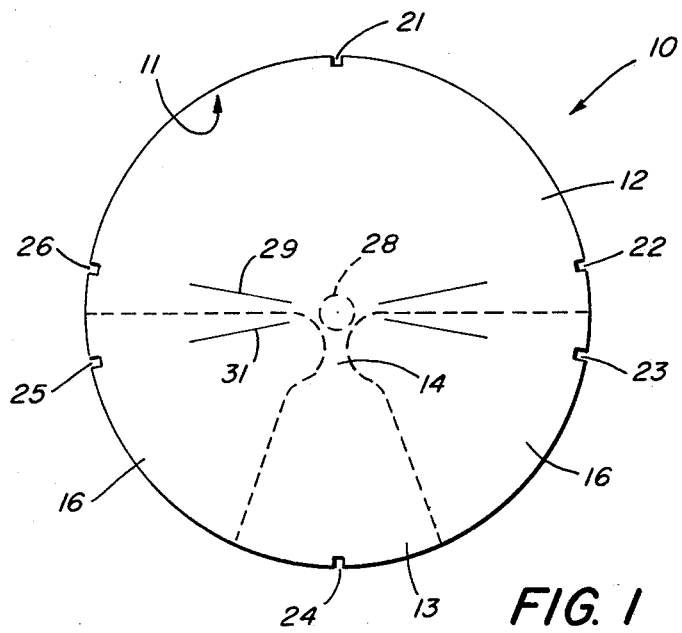
FIG. 1 schematically illustrates a progressive power lens having properly located notches on its edge in accordance with the present invention.

FIG. 1 schematically illustrates an ophthalmic progressive power lens 10 according to the present invention. Specifically, what is illustrated is the front convex surface 11 of such a lens which, in most embodiments, will be the progressive surface. As shown, the lens may be considered as being divided into at least four different portions or zones; distance portion 12, reading portion 13, progressive portion or corridor 14 and peripheral zones 16. Distance portion 12 occupies essentially the top half of the lens and is usually spherical in shape and of constant dioptric power for use in viewing objects at distant locations. The reading portion 13 is located near the bottom of the lens and is preferably also spherical and of constant dioptric power for use in viewing objects at normal reading distances. Progressive corridor 14 is located between and optically connects the distance and reading portions of the lens surface.

Specifically, progressive portion 14 comprises a corridor which extends from the distance to the reading portion and which gradually and continuously changes in power from a power equal to that of the distance portion where it joins and merges into the distance portion to a power equal to that of the reading portion where it merges into the reading portion.

In viewing through this corridor, clear vision will be obtainable for objects located at infinity when viewed through the top of the corridor and for objects located at a reading distance when viewed through the bottom of the corridor. Clear vision will be obtained for intermediate distances when viewed through intermediate portions of the corridor.

Reference number 16 identifies the peripheral portions or zones of the lens surface. The function of these zones is simply to complete the surface of the lens into one continuous surface.

It should be understood that the dotted line divisions illustrated in FIG. 1 between the various portions of the lens surface are provided only for ease in explanation. In actuality, there are no lines or discontinuities present, either physical or optical. Instead, each portion of the lens surface gradually blends into and merges with adjacent portions. As the eye scans across the lens, for example, from the reading portion to the progressive corridor or from the progressive corridor to a peripheral portion, the wearer will not be able to discern any precise area or line where the change from one area to the other took place.

Because there are no visible lines on the lens as in conventional multifocal lenses, it is necessary that some kind of physical features or markings be applied to the lens to permit the optical surfacing laboratory to locate certain optical features of the lens such as the optical center of the distance portion and the 0°-180° lines which are used to properly orient the lens to adjust for left or right eye. According to the present invention, these physical features or indicia are in the form of a plurality of notches positioned around the edge of the lens as illustrated in FIG. 1. Specifically, in FIG. 1, six notches are illustrated: 21, 22, 23, 24, 25 and 26. By using these notches, preferably in connection with a suitable device having fingers capable of rapidly mating with the notches, it becomes a simple matter to rapidly and accurately ink the distance portion optical center (indicated by dotted circle 28) and the 0°-180° lines 29 and 31.

In particular, if notches 22 and 25 are properly located along the periphery of the lens 10, a line 31 may be drawn between them which will define the 0°-180° axis for one eye. Similarly, line 29 may be drawn through properly located notches 23 and 26. The intersection of either of the 0°-180° lines with a line from notch 21 to notch 24 locates the distance portion optical center 28. Although the intersection of lines 29 and 31 could also be used to locate this center and thus permit elimination of notches 21 and 24, this is not preferred as the very steep angle between the two lines results in a reduced accuracy.

Figure 2:
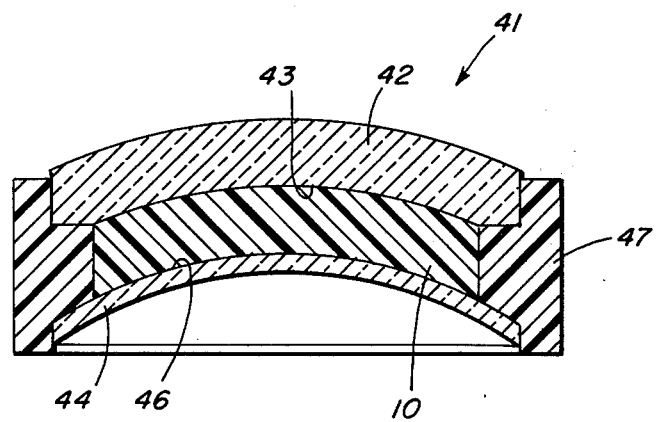
FIG. 2 schematically illustrates a cross-section of a typically circular mold assembly for molding a polymer lens.
Figure 3:
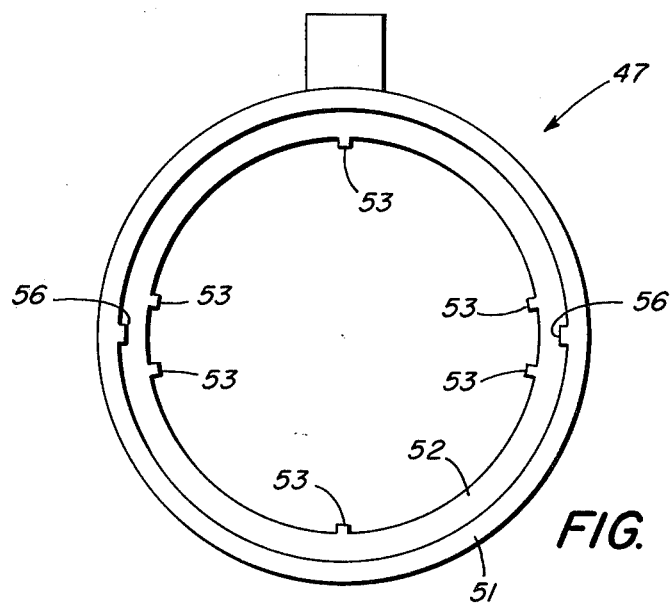
FIG. 3 schematically illustrates the top view of a gasket designed, in accordance with the present invention, to have ridges thereon for forming notches in the edge of a lens such as the lens of FIG. 1.
Figure 4:
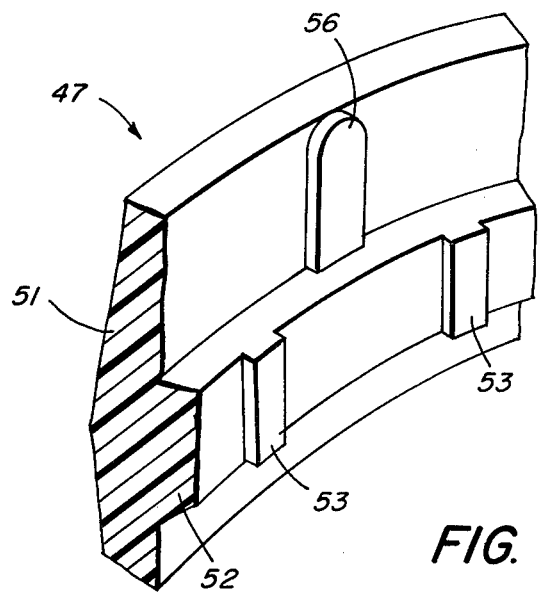
FIG. 4 schematically illustrates an enlarged portion of the gasket of FIG. 3 to assist in explaining the present invention.

FIGS. 2-4 illustrate the mold structure for casting the lens of FIG. 1 so as to automatically place the notches in the correct position around the edge of the lens. Specifically, FIG. 2 illustrates mold assembly 41 of generally conventional construction for use in casting a plastic lens such as lens 10. As shown, assembly 41 comprises an upper mold member 42 having a concave mold surface 43 for forming the convex progressive power surface on the lens, and a bottom mold member 44 having a convex surface 46 for defining the back concave surface of the lens. The space between the mold members is maintained by an annular gasket 47. A clip (not shown) is preferably provided to hold the various elements together during the casting process as is known in the art. A monomer such as CR-39 monomer is injected into the space between the mold members, and, after curing, the mold assembly is separated to release a finished lens such as lens 10.

FIGS. 3 and 4 illustrate the gasket 47 (FIG. 2) in greater detail, FIG. 3 being a top view of the entire gasket and FIG. 4 being an enlarged section of the gasket. The gasket comprises an annular ring having an outer ring portion 51 and an inwardly directed shoulder portion 52. As can be seen in the FIGS., shoulder portion 52 is provided with a plurality of indicia defining means or ridges 53, all six being shown in FIG. 3 and two being shown in FIG. 4.

As should be apparent, the six ridges create the six notches 21-26 in lens 10 (FIG. 1) when the lens is cast in the mold assembly of FIG. 2.

It is, of course, essential that the notches in the edge of the lens 10 be properly oriented with respect to the progressive lens surface to accurately locate the surface features of the lens. This necessitates that the ridges 53 be properly aligned relative to mold member 42, the surface 43 of which defines the progressive surface of the lens. The present invention provides an easy way for automatically assuring proper alignment.

Specifically, as shown in FIGS. 3 and 4, the gasket 47 is provided with two additional ridges 56 on the inner face of outer ring portion 51 of the gasket. These ridges are adapted to interlock or mate with grooves formed on the edge of the upper mold member 42 and when they do mate, the alignment of the gasket with the upper mold member is correctly accomplished in an automatic manner.

Thus, with the present invention, the precise location of the markings on a lens surface can be made rapidly and easily for use by the surfacing laboratory. The positioning of the mold members with respect to the gasket are also automatic as described above.

The ridges and associated notches are preferably about one millimeter wide by one-half of a millimeter deep, although this obviously can be varied within wide limits. The number, position and shape of the ridges and hence, of the notches, can also be varied in many ways. Furthermore, if desired, notches could be provided on the gasket to form ridges in the lens. Additionally, it is not intended to restrict the invention to progressive power lenses or to plastic lenses as it could readily be practiced in connection with other types of lenses as well. For example, another type of lenses currently being sold which may be marked with this invention is generally known as blended O-Style bifocals. For such lenses, notches could be provided to locate the outline of the blended O-Style bifocal add portion.

Finally, it should be apparent that the notches formed in the lens will be removed when the lens is edged for placement in a pair of frames.

While what has been described constitutes the presently most preferred embodiment of the invention, it can be varied in many ways, as is apparent from the above discussion, and the invention should, therefore, only be limited insofar as is required by the scope of the following claims.

I claim:

1. In a mold assembly for casting plastic lenses, said assembly including first and second mold members spaced from one another by gasket means to define a chamber within which a plastic lens is to be cast; the improvement comprising wherein said gasket means includes indicia defining means for forming indicia on the edge of a lens cast from thermosetting plastic in said chamber said idicia defining means being located at fixed positions along said edge in respect to interlocking means formed on one of said first and second mold members and on said gasket means and wherein the location of said indicia corresponds to optical surface characteristics of the lens.

2. A mold assembly as recited in claim 1 wherein said indicia defining means comprises a plurality of indicia defining means formed on an inwardly facing wall of said gasket means.

3. A mold assembly as recited in claim 2 wherein said plurality of indicia defining means comprises a plurality of ridges for producing a plurality of corresponding notches in the edge of a said lens, which notches are provided to assist in locating certain optical features of a surface of said lens.

4. A mold assembly as recited in claim 3 wherein said lens comprises a multifocal lens having no sharp dividing line between different portions of the lens.

5. A mold assembly as recited in claim 4 wherein said lens comprises a progressively variable focal power lens, and wherein said notches locate the 0°–180° lines and the distance portion optical center of said lenses.

6. A mold assembly as recited in claim 1 wherein said interlocking means joins said gasket means and said one of said mold members together for properly aligning said mold member relative to said gasket means.

7. A mold assembly as recited in claim 6 wherein said interlocking means comprise ridge means on said gasket means adapted to mate with notch means on said mold member.

8. A mold assembly as recited in claim 3 and further including interlocking means on both said gasket means and one of said mold members for joining said gasket means and said one of said mold members together for properly aligning said mold member relative to said gasket means.

9. A mold assembly as recited in claim 8 wherein said interlocking means comprise second ridge means on said gasket means adapted to mate with notch means on said mold member.

10. In a molded multifocal lens otherwise having no inherently visible multifocal lens features, the improvement comprising a plurality of notches formed by a gasket having notch defining means, said notches being formed at the time of molding and located in the edge thereof at precise positions around said lens for use in visually identifying by means of the unaided human eye and locating specific optical features of and on said lens.

11. A lens as recited in claim 10 wherein said lens comprises a progressively variable focal power lens, and wherein said notches are positioned to permit location of the distance portion optical center of said lens and the 0°–180° lines of said lens.

* * * * *